(12) United States Patent
Saito et al.

(10) Patent No.: US 8,767,327 B1
(45) Date of Patent: Jul. 1, 2014

(54) HEAT-ASSISTED MAGNETIC RECORDING (HAMR) DISK DRIVE AND METHOD FOR WRITING

(71) Applicant: HGST Netherlands B.V., Amsterdam (NL)

(72) Inventors: Kosuke Saito, Fujisawa (JP); Takayuki Ichihara, Setagara-ku (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/922,616

(22) Filed: Jun. 20, 2013

(51) Int. Cl.
*G11B 5/02* (2006.01)
*G11B 11/00* (2006.01)

(52) U.S. Cl.
USPC .......................................... 360/50; 369/13.33

(58) Field of Classification Search
USPC .......... 360/59, 72.1, 77.08; 369/13.33, 13.34, 369/13.35
See application file for complete search history.

(56) References Cited

U.S. PATENT DOCUMENTS

| | | | |
|---|---|---|---|
| 5,144,601 A * | 9/1992 | Maeda et al. | 369/13.25 |
| 5,440,474 A | 8/1995 | Hetzler | |
| 7,080,200 B2 | 7/2006 | Hassner et al. | |
| 2011/0228651 A1 | 9/2011 | Gage et al. | |
| 2012/0082015 A1 | 4/2012 | Grobis et al. | |
| 2012/0275279 A1 | 11/2012 | Wilson et al. | |

* cited by examiner

*Primary Examiner* — Nabil Hindi
(74) *Attorney, Agent, or Firm* — Thomas R. Berthold (57) ABSTRACT

A heat-assisted magnetic recording (HAMR) disk drive has a laser, a transducer coupled to the laser and a rotatable disk. The disk has a recording layer with concentric or spiral data tracks, servo sectors extending across the tracks, a laser power gap adjacent each servo sector, and data sectors between the laser power gaps and the servo sectors. The servo sector preceding the first data sector to be written and the servo sector following the last data sector to be written are identified. Any old data in the data sectors between said first and last servo sectors is acquired, and the old and new data is combined. The laser is turned on when the laser power gap adjacent the first servo sector rotates past the transducer. The combined old and new data is then written in all of the data sectors continuously between said first and last servo sectors.

16 Claims, 6 Drawing Sheets

HEAT-ASSISTED MAGNETIC RECORDING (HAMR) DISK DRIVE AND METHOD FOR WRITING

TECHNICAL FIELD

This invention relates generally to a heat-assisted magnetic recording (HAMR) head in a HAMR disk drive, in which data are written while the magnetic recording layer on the disk is at an elevated temperature.

BACKGROUND OF THE INVENTION

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing by the write head to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head, i.e., a giant magnetoresistance (GMR) or tunneling magnetoresistance (TMR) based read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed HAMR disk drive uses a laser source and an optical waveguide coupled to a transducer, e.g., a near-field transducer (NFT), for heating the recording material on the disk. A "near-field" transducer is an optical device with subwavelength features that is used to concentrate the light delivered by the waveguide into spot smaller than the diffraction limit and at distance smaller than the wavelength of light. In a HAMR head, the NFT is typically located at the air-bearing surface (ABS) of the slider that also supports the read/write head and rides or "flies" above the disk surface while creating the sub-diffraction-limited optical spot on the disk.

A problem with writing of data in a HAMR disk drive is that several microseconds are required to stabilize the laser power once the laser is turned on. However, in conventional disk drives the gap length between data sectors where the data is to be written corresponds to only several hundreds of nanoseconds. This is insufficient time for the laser power to stabilize prior to writing to the data sectors by the write head. Thus the use of much longer gaps for each data sectors means there is a large loss of disk real estate.

What is needed is a HAMR disk drive and method for writing to the data sectors that does not result in loss of disk real estate.

SUMMARY OF THE INVENTION

Embodiments of the invention relate to a heat-assisted magnetic recording (HAMR) disk drive that has a magnetic recording disk having a recording layer that has concentric or spiral data tracks, angularly spaced servo sectors extending across the tracks, a laser power gap adjacent each servo sector, and data sectors in the tracks between the laser power gaps and the servo sectors. In an embodiment of the method for writing data to the data sectors, new data is received and the location of the data sectors where the new data is to be written is identified. This enables a determination of the servo sector preceding the first data sector to be written and the servo sector following the last data sector to be written. Any old data in the data sectors between said first and last servo sectors is acquired, either from a data cache or by reading from the disk. The old and new data is combined. The laser is turned on when the laser power gap adjacent the first servo sector rotates past the transducer. The write head is turned on and the combined old and new data is then written in all of the data sectors continuously between said first and last servo sectors. By writing to all of the data sectors continuously between the first and last servo sectors, only one gap per servo sector is required to allow laser power to stabilize.

For a fuller understanding of the nature and advantages of the present invention, reference should be made to the following detailed description taken together with the accompanying figures.

DETAILED DESCRIPTION OF THE INVENTION

Figure 1:
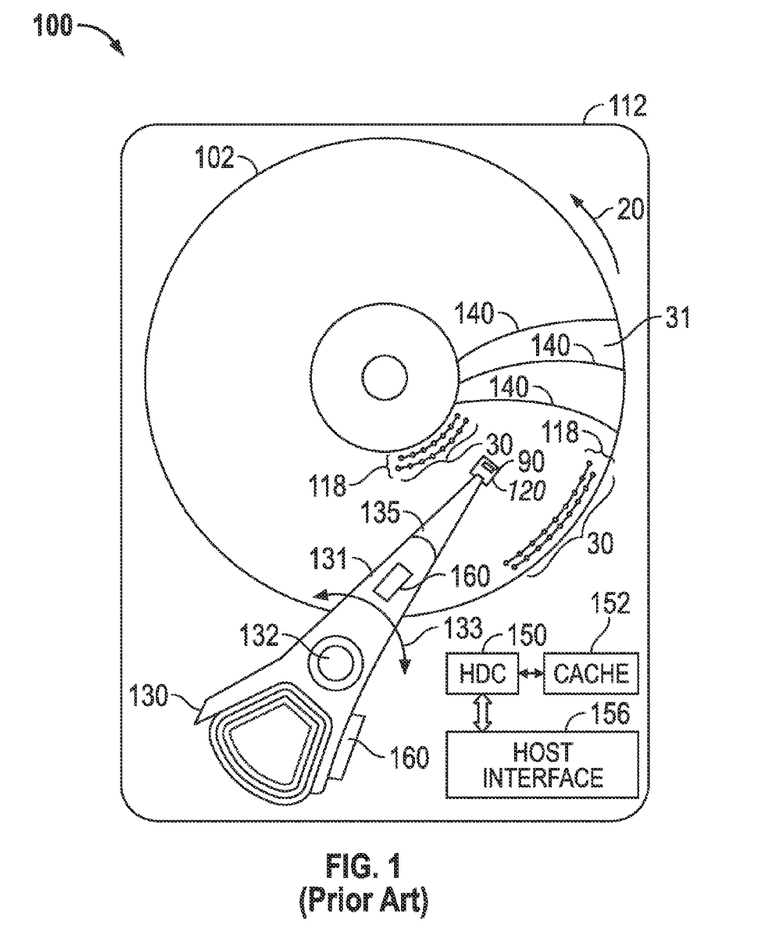
FIG. 1 is a top view of a heat-assisted magnetic recording (HAMR) disk drive according to an embodiment of the invention.

FIG. 1 is a top view of a thermally-assisted recording (HAMR) disk drive 100 according to embodiments of the invention. In FIG. 1, the HAMR disk drive 100 is depicted with a disk 102 with the magnetic recording layer 31 patterned into discrete data islands 30 of magnetizable material arranged in radially-spaced circular tracks 118. Only a few representative islands 30 and representative tracks 118 near the inner and outer diameters of disk 102 are shown. However, instead of the bit-patterned-media (BPM) shown with discrete data islands 30 in FIG. 1, the HAMR disk drive may instead use disks in which the recording layer 31 is a conventional continuous magnetic recording layer of magnetizable material. The disk 102 also contains a plurality of servo sectors, three of which are shown as servo sectors 140, which are equally angularly spaced around the disk and extend across the tracks 118 in a generally radial direction. The servo sectors 140 are nondata regions on the disk 102 that are magnetized once, typically during manufacturing or formatting of the disk, and are not intended to be erased during normal operation of the disk drive. There typically may be between approximately 200 and 400 servo sectors 140 on each disk surface.

The drive 100 has a housing or base 112 that supports an actuator 130 and a drive motor for rotating the magnetic recording disk 102. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. An arm electronics (AE) module 160 is mounted on the actuator arm 131. The suspension 135 permits the slider 120 to be maintained very close to the surface of disk 102 and enables it to "pitch" and "roll" on the air-bearing generated by the disk 102 as it rotates in the direction of arrow 20. The slider 120 supports the HAMR head (not shown), which includes a magnetoresistive read head, an inductive write head, the near-field transducer (NFT) and optical waveguide. A semiconductor laser diode 90 with a wavelength of 780 to 980 nm may be used as the HAMR light source and is depicted as being supported on the top of slider 120. Alternatively the laser may be located on suspension 135 and coupled to slider 120 by an optical channel. As the disk 102 rotates in the direction of arrow 20, the movement of actuator 130 allows the HAMR head on the slider 120 to access different data tracks 118 on disk 102. Only one disk surface with associated slider and HAMR head is shown in FIG. 1, but there are typically multiple disks stacked on a hub that is rotated by a spindle motor, with a separate slider and HAMR head associated with each surface of each disk.

The drive 100 also includes a hard disk controller (HDC) 150 that can include and/or be implemented by a microcontroller or microprocessor. The HDC 150 is connected to a host interface 156 that communicates with the host computer. The host interface 156 may be any conventional computer-HDD interface, such as Serial ATA (Advanced Technology Attachment) or SAS (Serial Attached SCSI). The HDC 150 includes or is connected to solid state memory that includes a data cache 152 that temporarily holds data before it is transferred between the host computer and the disk 102. The HDC 150 runs a computer program that is stored in memory and that embodies the logic and algorithms described further below. ++The memory may be separate from HDC 150 or as embedded memory on the HDC 150 chip. The computer program may also be implemented in microcode or other type of memory accessible to the HDC 150.

Figure 2A:
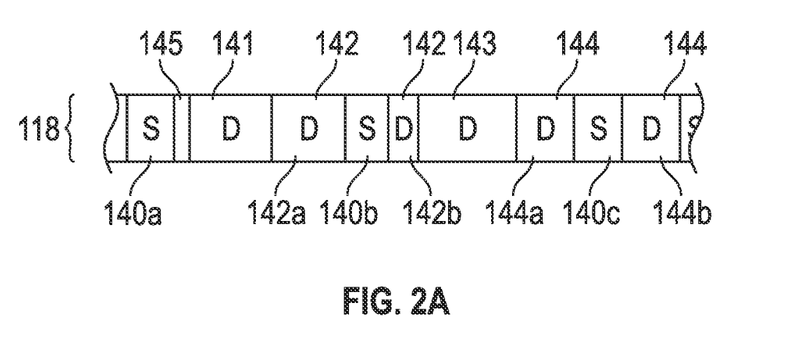
FIG. 2A is a schematic of a portion of a typical data track showing representative data sectors and servo sectors.
Figure 2B:
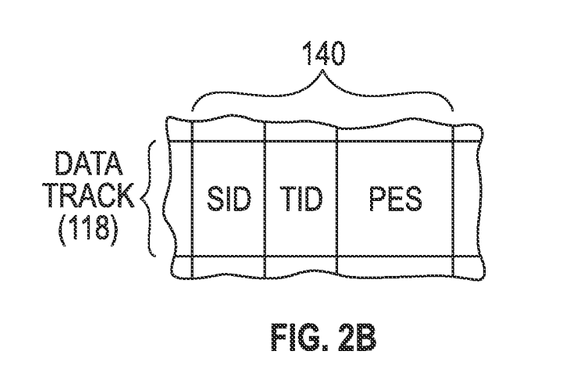
FIG. 2B is a schematic showing the fields making up a typical servo sector.

Referring now to FIG. 2A, a portion of a typical track 118 on the disk 102 is shown expanded. Four complete data sectors are shown (141, 142, 143 and 144). Three representative servo sectors 140a, 140b, and 140c are also shown. As can be seen from this example, some data sectors can be split by servo sectors, and some data sectors do not start immediately following a servo sector. For example, data sectors 142 and 144 are split by servo sectors 140b and 140c, respectively. Data sector 142 is split into data sections 142a and 142b, and data sector 144 is split into data sections 144a and 144b. Data sector 143 starts immediately after the end of data sector 142, rather than immediately following a servo sector. Each data sector typically contains a preamble for sync, 512 or 4K bytes of data, and a number of error correction code (ECC) bytes at the end of the data sector. An index mark 145 indicates the beginning of the track and is shown contained in servo sector 140a. Referring now to FIG. 2B, each of the servo sectors 140 in a data track typically contains a servo identification (SID) field that indicates the start of the servo sector and serves as a timing reference for reading the subsequent servo information, a track identification (TID) field, which is typically a Gray-code, and a portion of a pattern of magnetized blocks or high-frequency bursts that form the head position error signal (PES) field. The PES fields are detected by the read head and decoded to provide a PES, which is a measure of how far the head is off track from the desired track centerline.

In the operation of the HAMR disk drive 100, the HDC 150 acts as a data controller to transfer blocks of write data from the host computer for writing to the disk 102, and to transfer blocks of read data from the disk 102 back to the host computer. Interface 156 receives commands from the host computer for writing blocks of data to the data sectors. The host computer uses logical block addresses (LBAs) in commands to write blocks of data without regard for actual locations (physical block addresses or PBAs associated with the data sectors) used internally by the disk drive 100. The HDC 150 receives a list of LBAs from interface 156 and translates them into a set of PBAs that uniquely identify the disk surface, track and data sector. The PBAs are used to enable positioning the HAMR head to the appropriate data sector.

Figure 3:
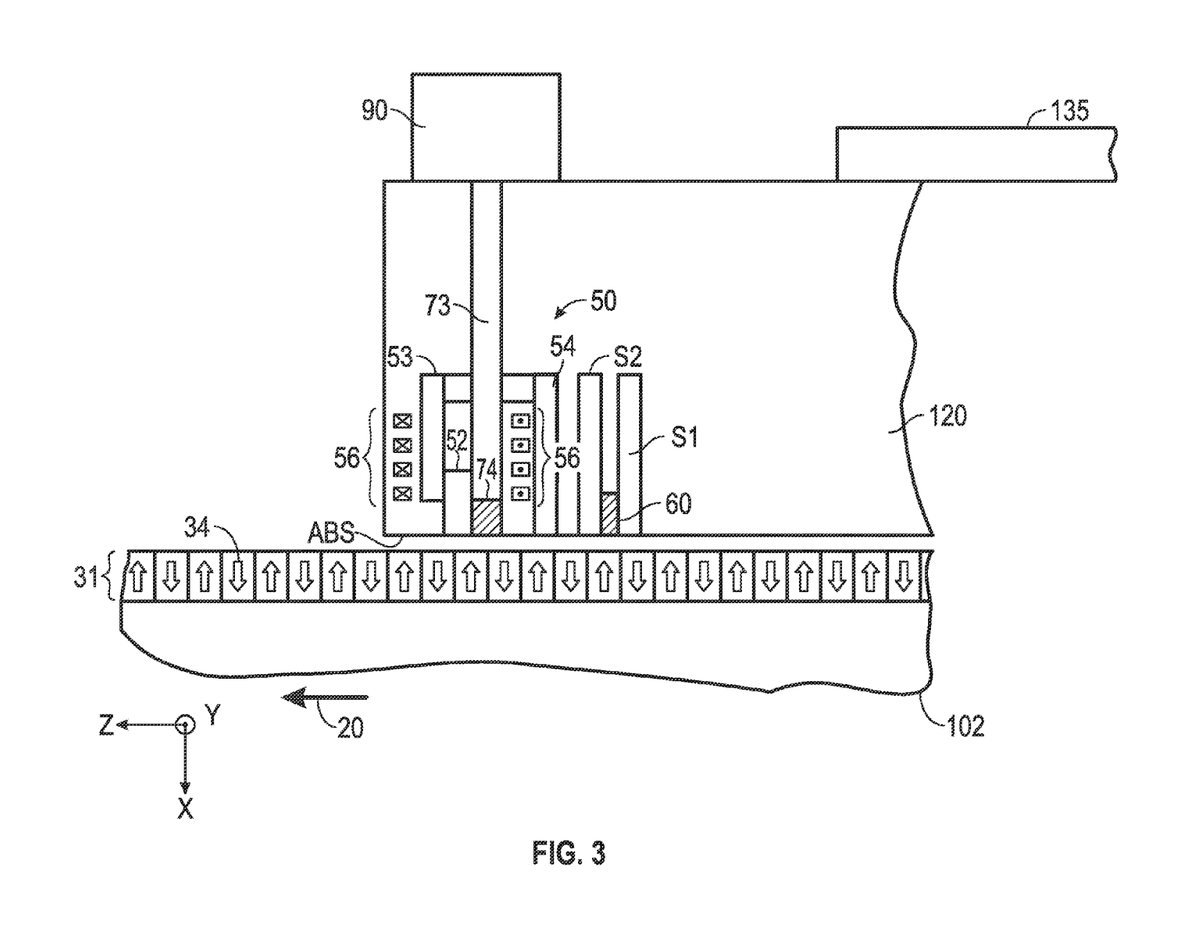
FIG. 3 depicts a sectional view, not drawn to scale because of the difficulty in showing the very small features, of an air-bearing slider for use in HAMR disk drive and a portion of a HAMR disk according to the invention.

FIG. 3 is a schematic cross-sectional view illustrating a configuration example of a HAMR head. The X direction denotes a direction perpendicular to the air-bearing surface (ABS) of the slider 120, the Y direction denotes a track width or cross-track direction, and the Z direction denotes an along-the-track direction. In FIG. 3, the disk 102 is depicted with the recording layer 31 being a conventional continuous magnetic recording layer of magnetizable material with magnetized regions or "bits" 34. The air-bearing slider 120 is supported by suspension 135 and has an ABS that faces the disk 102 and supports the magnetic write head 50, read head 60 with magnetically permeable read head shields 51 and S2, and the optical near-field transducer (NFT) 74. A semiconductor laser 90 is mounted to the top surface of slider 120. An optical waveguide 73 guides light from laser 90 to NFT 74. A recording magnetic field is generated by the write head 50 made up of a coil 56, a magnetic main pole 53 for transmitting flux generated by the coil 56, a write pole 52 connected to main pole 53, and a return pole 54. The magnetic field generated by the coil 56 is transmitted through the main pole 53 to the write pole 52 located at the ABS near the NFT 74. At the moment of recording, the recording layer 31 of disk 102 is heated by an optical near-field generated by the NFT 74 and, at the same time, a region or "bit" 34 is magnetized and thus written onto the recording layer 31 by applying a recording magnetic field from the write pole 52.

Figure 4:
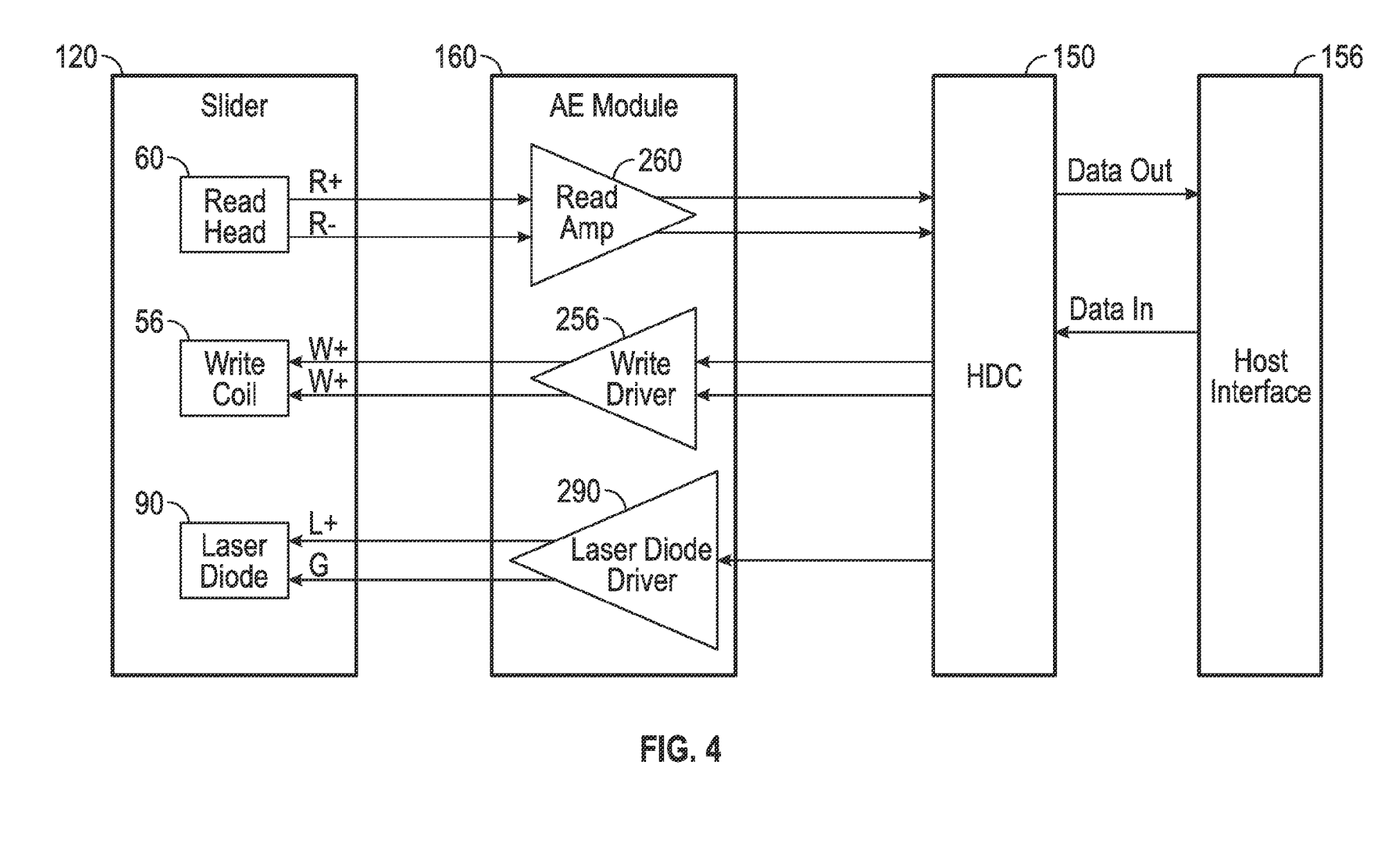
FIG. 4 is a high level block diagram showing the electrical connection between the slider, the arm electronics (AE) module, the hard disk controller (HDC) and the host interface.

FIG. 4 is a high level block diagram showing the electrical connection between the slider 120, the AE module 160, the HDC 150 and the host interface 156. The connections between slider 120 and AE module 160 are via an integrated lead suspension (ILS) (not shown) along the actuator arm 131 and suspension 135 and include R+/R− connections between the read head 60 and the read amplifier 260, W+/W− connections between the write coil 56 and the write driver 256, and a (L+) and ground (G) connections between the laser diode 90 and laser diode driver 290. During operation of the disk drive, the HDC 150 sends read and write commands to AE module 160 to read or write data to and from selected data sectors in the data tracks. The laser diode driver 290 includes registers which store sets of laser diode power values to be used during writing. When the HDC 150 sends write commands to AE module 160, the laser diode driver 290 registers are updated so that the correct laser power values are used and correctly timed with the writing of data to the selected data sectors.

A problem with writing of data in a HAMR disk drive is that several microseconds are required to stabilize the laser power once the laser diode is turned on. However, the gap length between data sectors in conventional disk drives corresponds to only several hundreds of nanoseconds between data sectors. Therefore there is a large loss of disk real estate to accommodate the much longer gap length for each data sector to allow for the laser power to stabilize prior to writing to the data sectors. For example, in a typical disk drive with 512-byte data sectors and 200 equally angularly spaced servo sectors, there may be about 16 data sectors between successive servo sectors near the disk outside diameter and about 8 data sectors between successive servo sectors near the disk inside diameter.

Figure 5:
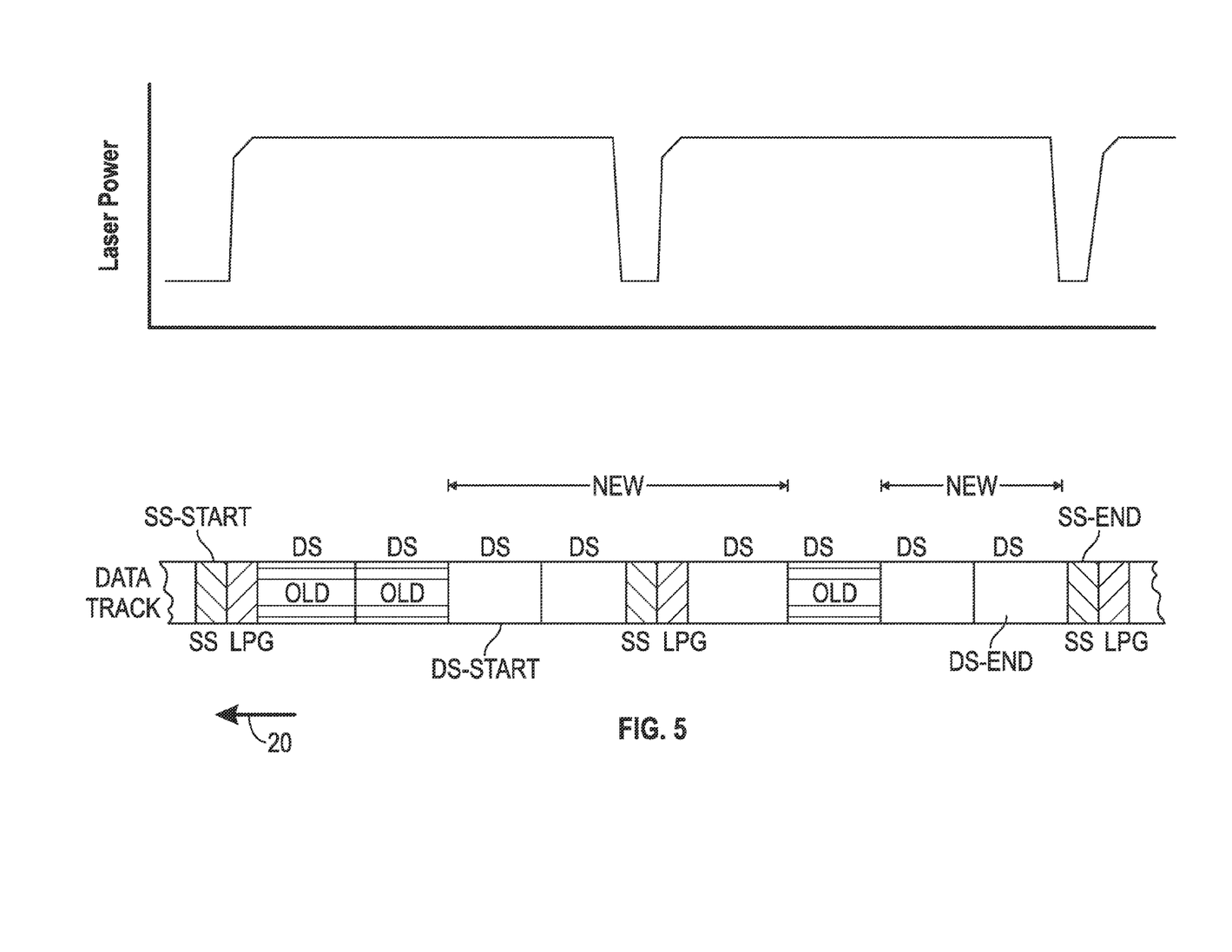
FIG. 5 is an illustration of a portion of a data track and a corresponding laser power profile in an embodiment of the invention.

FIG. 5 shows a portion of a data track and a corresponding laser power profile in an embodiment of the invention. In the data track example there are three servo sectors (SS). Each servo sector has located adjacent to it a laser power gap (LPG). The LPG is a physical non-data area that provides a time gap for the laser power to stabilize. There are only four data sectors (DS) between each servo sector for ease of illustration, although this number will vary based upon the radial location of the data track. Also, for ease of illustration the preamble and ECC bytes associated with each data sector are not shown, and any data sectors split into sections by the servo sectors are not shown. As the disk rotates in the direction of arrow 20, the servo sectors, LPGs and data sectors move past the NFT and write head, which apply heat and a magnetic write field. In this example, between a SS-start and a SS-end there are three data sectors that contain old data, five data sectors where new data is to be written and an intermediate servo sector between SS-start and SS-end. There are five data sectors for the new data beginning with a DS-start and ending with a DS-end. Each time new data is written the old data is also rewritten. As illustrated in the laser power profile in FIG. 5, the laser power is turned on during the LPG. The data is written continuously in all the data sectors between adjacent servo sectors. Each time a servo sector is encountered laser power is turned off and then turned on again during the adjacent LPG. The old data is read by the read head and then combined with the new data, after which both the old and new data are rewritten during the next rotation of the disk. If the old data is already in cache, it is combined with the new data and rewritten without requiring waiting for an additional disk rotation.

Figure 6:
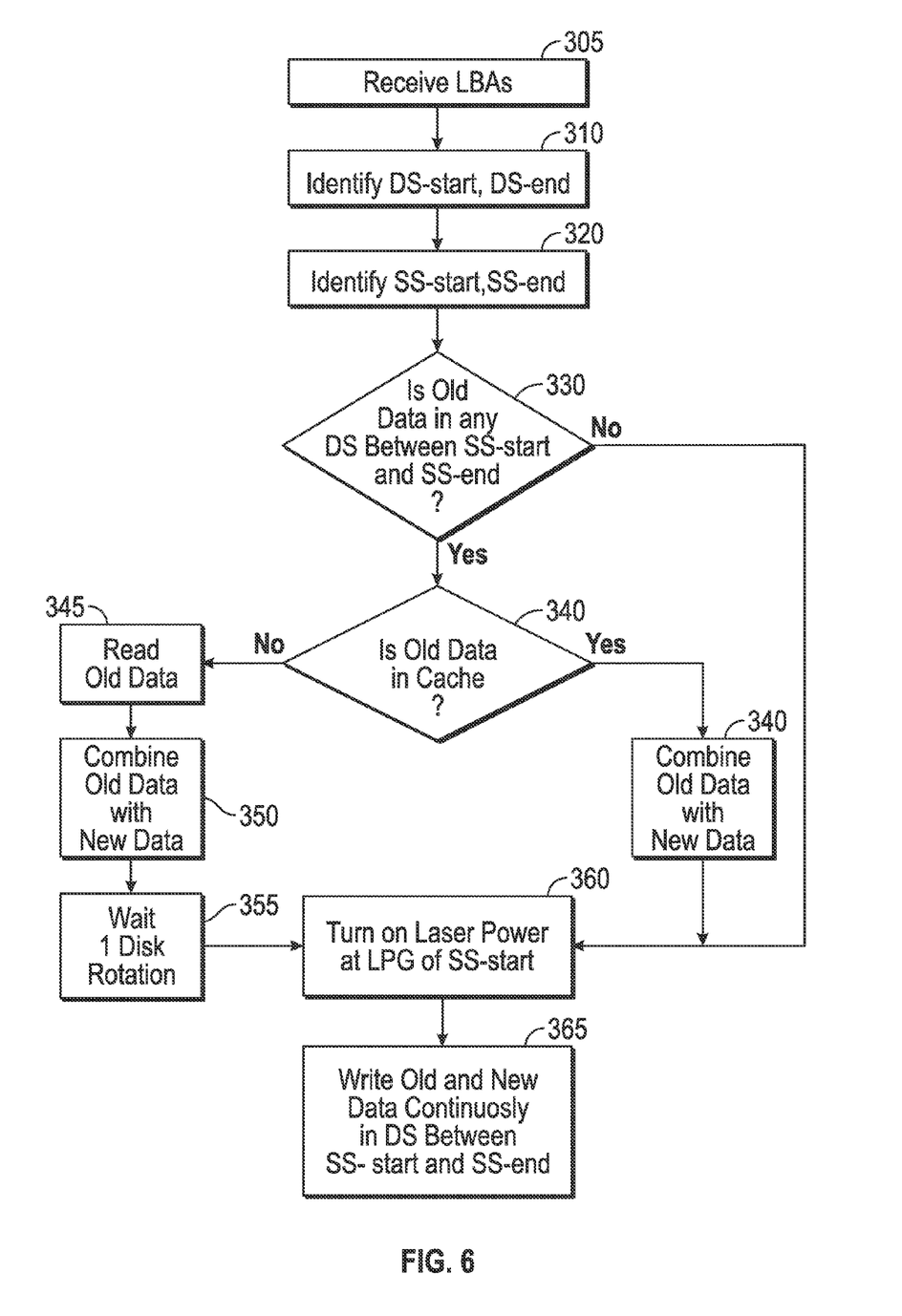
FIG. 6 is a flow chart illustrating an embodiment of the invention for writing to the data sectors.

FIG. 6 is a flow chart illustrating a method of an embodiment of the invention. At block 305, the HDC receives a list of LBAs from the host interface for new data to be written. At block 310, the HDC determines the PBAs for the data sectors where the new data is to be written and thus identifies DS-start and DS-end. At block 320, with knowledge of DS-start and DS-end, the SS-start and SS-end are identified. At decision block 330, the HDC determines if any LBAs associated with data sectors between SS-start and SS-end contain old data. If YES at block 330, then at decision block 340 a determination is made as to whether the old data is in cache. If YES at block 340, then the old data is retrieved from cache and combined with the new data to be continuously written to all data sectors between SS-start and SS-end. While not depicted in the flow chart of FIG. 5, ECC bytes are typically calculated for the combined data, appended to the data, and written to the disk along with the combined data. If NO at block 340, then at block 345 the old data is read by the read head, and then at block 350 combined with the new data to be continuously written to all data sectors between SS-start and SS-end. Because the old data had to be read from the disk, at block 355 a wait for at least one disk rotation is required before the combined data can be written. Then at block 360 the laser power is turned on during the LPG adjacent SS-start. At block 365, the write current is turned on and the old and new data is written continuously to all data sectors between SS-start and SS-end. If NO at decision block 330, then only the new data is written continuously in the required number of successive data sectors between SS-start and SS-end, with no need to write into any empty data sectors. If there are any intermediate servo sectors between SS-start and SS-end, then each time a servo sector becomes aligned with the NFT, the laser power is turned off and then turned on again at the LPGs associated with the intermediate servo sectors, as illustrated in FIG. 5. By writing to all of the data sectors continuously between the first and last servo sectors, there is no need for a laser power gap preceding each data sector. Only one laser power gap per servo sector is required, which substantially reduces the amount of disk real estate required.

The operation of the HAMR disk drive as described above may be implemented as a set of computer program instructions stored in memory and executable by a processor, such as the HDC, or a separate controller or microprocessor in the disk drive. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for writing data in a heat-assisted magnetic recording (HAMR) disk drive having a read head, a write head for generating a magnetic field, a laser, a transducer coupled to the laser for generating heat, and a magnetic recording disk having a recording layer, the recording layer having a plurality of data tracks, a plurality of angularly spaced servo sectors extending generally radially across the tracks, a laser power gap adjacent each servo sector, and a plurality of data sectors in the tracks and located between the laser power gaps and the servo sectors, the disk being rotatable past the write head and the transducer, the method comprising:
   receiving new data to be written to the data sectors;
   determining which data sectors are to be written with the new data;
   determining from the data sectors to be written the servo sector preceding the first data sector to be written and the servo sector following the last data sector to be written;
   acquiring old data from data sectors between said first and last servo sectors;
   combining the old data with the new data;
   turning on laser power to generate heat with the transducer when the transducer is aligned with the laser power gap adjacent said first servo sector;
   generating a magnetic field with the write head; and
   writing the combined old and new data in all of the data sectors successively between said first and last servo sectors by simultaneously heating the recording layer and applying a magnetic field to the recording layer as the disk rotates.

2. The method of claim 1 wherein the disk drive includes a data cache, and wherein acquiring said old data comprises acquiring said old data from the data cache.

3. The method of claim 1 wherein acquiring said old data comprises reading said old data with the read head, and further comprising, after the old data has been read, waiting at least one disk rotation before turning on the laser power.

4. The method of claim 1 further comprising, if there are intermediate servo sectors between said first and last servo sector, turning off laser power when the transducer is aligned with said intermediate servo sectors and turning laser power on when the transducer is aligned with the laser power gaps adjacent said intermediate servo sectors.

5. The method of claim 1 wherein combining the old data with the new data comprises calculating error correction code (ECC) bytes for the old and new data, and wherein writing the combined old and new data comprises writing the ECC bytes.

6. The method of claim 1 wherein some of the data sectors in some of the data tracks are split by the servo sectors into data sections.

7. The method of claim 1 wherein the data sectors have a fixed length selected from 512 bytes and 4K bytes.

8. The method of claim 1 wherein the recording layer has between 200 and 400 servo sectors.

9. A heat-assisted magnetic recording (HAMR) disk drive comprising:
   a rotatable magnetic recording disk having a recording layer, the recording layer having a plurality of tracks, a plurality of angularly spaced servo sectors extending generally radially across the tracks, a gap adjacent each servo sector, and a plurality of data sectors in the tracks and located between the gaps and the servo sectors;
   a read head for reading data in the data sectors;
   a laser capable of being turned on when the gaps rotate past the transducer;
   a transducer coupled to the laser for heating the recording layer when the laser is turned on; and
   a write head including a write coil for applying a magnetic field to the recording layer when the laser is turned on.

10. The disk drive of claim 9 wherein some of the data sectors in some of the data tracks are split by the servo sectors into data sections.

11. The disk drive of claim 9 wherein the data sectors have a fixed length selected from 512 bytes and 4K bytes.

12. The disk drive of claim 9 wherein the recording layer has between 200 and 400 servo sectors.

13. The disk drive of claim 9 further comprising a controller coupled to the laser and the write coil for controlling the writing of data to the data sectors, and memory coupled to the controller and containing a program of instructions readable by the controller, the program of instructions undertaking the method acts comprising:
   receiving new data to be written to the data sectors;
   determining which data sectors are to be written with the new data;
   determining from the data sectors to be written the servo sector preceding the first data sector to be written and the servo sector following the last data sector to be written;
   acquiring old data from data sectors between said first and last servo sectors;
   combining the old data with the new data;
   turning on the laser to generate heat with the transducer when the gap adjacent said first servo sector rotates past the transducer;
   turning on the write coil to generate a magnetic field with the write head; and
   writing the combined old and new data in all of the data sectors successively between said first and last servo sectors by simultaneously heating the recording layer and applying a magnetic field to the recording layer as the disk rotates.

14. The disk drive of claim 13 wherein the disk drive includes a data cache coupled to the controller, and wherein the method act of acquiring said old data comprises acquiring said old data from the data cache.

15. The disk drive of claim 13 wherein the method act of acquiring said old data comprises reading said old data with the read head, and further comprising the method act of, after the old data has been read, waiting at least one disk rotation before turning on the laser.

16. The disk drive of claim 13 wherein the method acts further comprise, if there are intermediate servo sectors between said first and last servo sector, turning the laser off when said intermediate servo sectors rotate past the transducer and turning the laser on when the gaps adjacent said intermediate servo sectors rotate past the transducer.

* * * * *